United States Patent
Wu

(10) Patent No.: US 6,332,621 B1
(45) Date of Patent: Dec. 25, 2001

(54) FOLDING STRUCTURE FOR A SKATE BOARD SCOOTER

(76) Inventor: Meng-Liang Wu, No. 51, Lane 303, Sec. 4, Yuanlu Rd., Hsihu Chen, Changhua Hsien (TW)

(*) Notice: Subject to any disclaimer, the term of this patent is extended or adjusted under 35 U.S.C. 154(b) by 0 days.

(21) Appl. No.: 09/598,687

(22) Filed: Jun. 21, 2000

(51) Int. Cl.[7] .................................................. B62M 1/00
(52) U.S. Cl. ................... 280/87.041; 16/900; 280/87.05; 403/92
(58) Field of Search ..................... 16/900, 421; 403/91, 403/92, 94, 96; 280/87.021, 87.041, 87.042, 87.05

(56) References Cited

U.S. PATENT DOCUMENTS

| | | | |
|---|---|---|---|
| 6,173,976 | * | 1/2001 | Lee .................................. 280/87.041 |
| 6,179,307 | * | 1/2001 | Mao .................................. 280/87.05 |
| 6,206,387 | * | 3/2001 | Tsai .................................. 403/92 |
| 6,234,501 | * | 5/2001 | Chen .................................. 280/87.041 |
| 6,270,095 | * | 8/2001 | Chang .................................. 280/87.041 |

* cited by examiner

Primary Examiner—Michael Mar
(74) Attorney, Agent, or Firm—Rosenberg, Klein & Lee

(57) ABSTRACT

A skate board scooter includes a base, a head tube, a handlebar stem extended through the head tube, and a connecting member extended from the head tube. A first mounting wall and a second mounting wall are mounted on the first end of the base. The first mounting wall and the second mounting wall are spaced to allow the lower end of the connecting member to pivot therebetween. The first mounting wall includes a first positioning hole and a second positioning hole. The second mounting wall includes a third positioning hole aligned with the first positioning hole, a fourth positioning hole aligned with the second positioning hole, and a connecting slot that communicates the third positioning hole with the fourth positioning hole. A pivotal pin is extended through aligned pivotal holes of the first mounting wall and the second mounting wall and a pivotal hole of the connecting member. A quick release rod is extended through aligned arcuate guide holes of the first mounting wall and the second mounting wall and an adjusting hole of the connecting member. A quick release lever is engaged with an end of the quick release rod. A positioning rod is extended through a guide hole of the connecting member. A first end of the positioning rod is releasably engaged in one of the first positioning hole and the second positioning hole and a second end of the positioning rod is releasably engaged in one of the third positioning hole and the fourth positioning hole.

4 Claims, 5 Drawing Sheets

FOLDING STRUCTURE FOR A SKATE BOARD SCOOTER

BACKGROUND OF THE INVENTION

1. Field of the Invention

The present invention relates to a folding structure for a skate board scooter that allows the skate board scooter to be folded when not in use.

2. Description of the Related Art

Skate board scooters have recently become popular. A problem for users and manufacturers is the storage and transport of the bulky volume of the skate board scooter when not in use. The present invention is intended to provide a folding structure for a skate board scooter to solve this problem.

SUMMARY OF THE INVENTION

A skate board scooter in accordance with the present invention comprises:

a base having a front end;

a head tube;

a handlebar stem extended through the head tube;

a connecting member extended from the head tube and having a lower end, the lower end of the connecting member including a pivotal hole, a guide hole, and an adjusting hole;

a first mounting wall and a second mounting wall mounted on the first end of the base, the first mounting wall and the second mounting wall being spaced to allow the lower end of the connecting member to pivot therebetween, the first mounting wall and the second mounting wall including aligned arcuate guide holes and aligned pivotal holes, the first mounting wall including a first positioning hole and a second positioning hole, the second mounting wall including a third positioning hole aligned with the first positioning hole, a fourth positioning hole aligned with the second positioning hole, and a connecting slot that communicates the third positioning hole with the fourth positioning hole;

a pivotal pin extended through the aligned pivotal holes of the first mounting wall and the second mounting wall and the pivotal hole of the connecting member;

a quick release rod extended through the aligned arcuate guide holes of the first mounting wall and the second mounting wall and the adjusting hole of the connecting member;

a quick release lever engaged with an end of the quick release rod;

a positioning rod including a first end and a second end, the positioning rod being extended through the guide hole of the connecting member with the first end of the positioning rod releasably engaged in one of the first positioning hole and the second positioning hole and with the second end of the positioning rod releasably engaged in one of the third positioning hole and the fourth positioning hole;

whereby the handlebar stem is in an operative position when the first end of the positioning rod is engaged in the first positioning hole and the second end of the positioning rod is engaged in the third positioning hole, and the handlebar stem is in a storage position when the first end of the positioning rod is engaged in the second positioning hole and the second end of the positioning rod is engaged in the fourth positioning hole.

The second end of the positioning rod is enlarged to be grasped by a user. The first end of the positioning rod is disengaged from an associated one of the first positioning hole and the second positioning hole and moved into the guide hole of the connecting member to allow pivotal movement of the connecting member when the enlarged second end of the positioning rod is pulled out of the second mounting wall. A spring is provided for biasing the first end of the positioning rod into the associated one of the first positioning hole and the second positioning hole. The enlarged second end of the positioning rod includes a reduced section that is removably engaged in an associated one of the third positioning hole and the fourth positioning hole.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
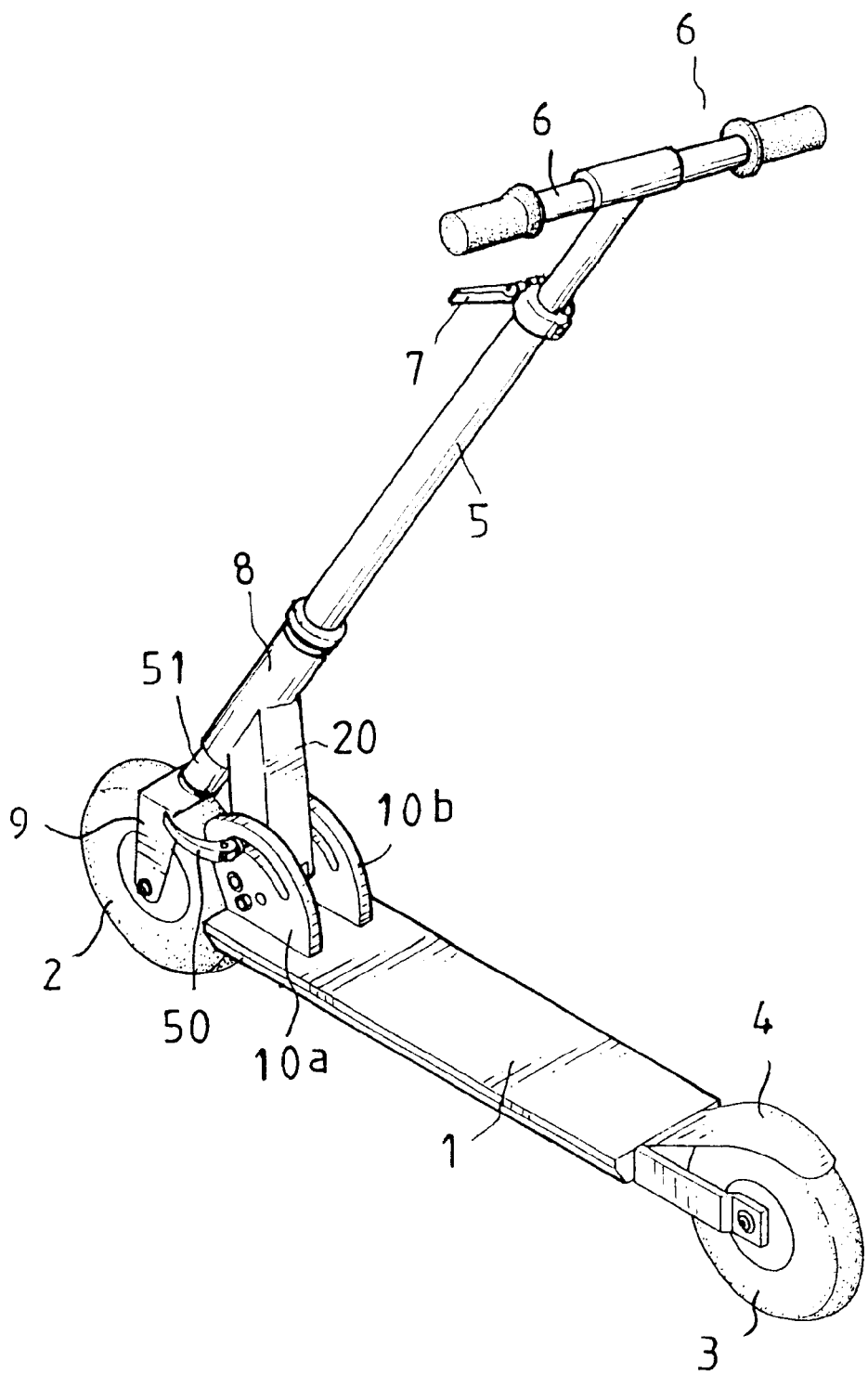
FIG. 1 is a perspective view of a skate board scooter in accordance with the present invention.

Referring to FIG. 1, a skate board scooter in accordance with the present invention generally includes a base 1 with a rear wheel 3 attached to a rear end thereof A brake 4 is provided to the rear end of the base 1. Mounted to the front end of the base 1 are two spaced mounting walls 10a and 10b of a folding structure in accordance with the present invention. A connecting member 20 is mounted between the mounting walls 10a and 10b. The connecting member 20 has an upper end extended from a head tube 8 through which a handlebar stem 5 extends. Formed on top of the handlebar stem 5 are two handlebars 6. A quick release 7 is provided to control adjustment of the level of the handlebar stem 5. A U-shape bracket 9 is securely attached to a lower end 51 of the handlebar stem 5 for mounting a front wheel 2.

Figure 2:
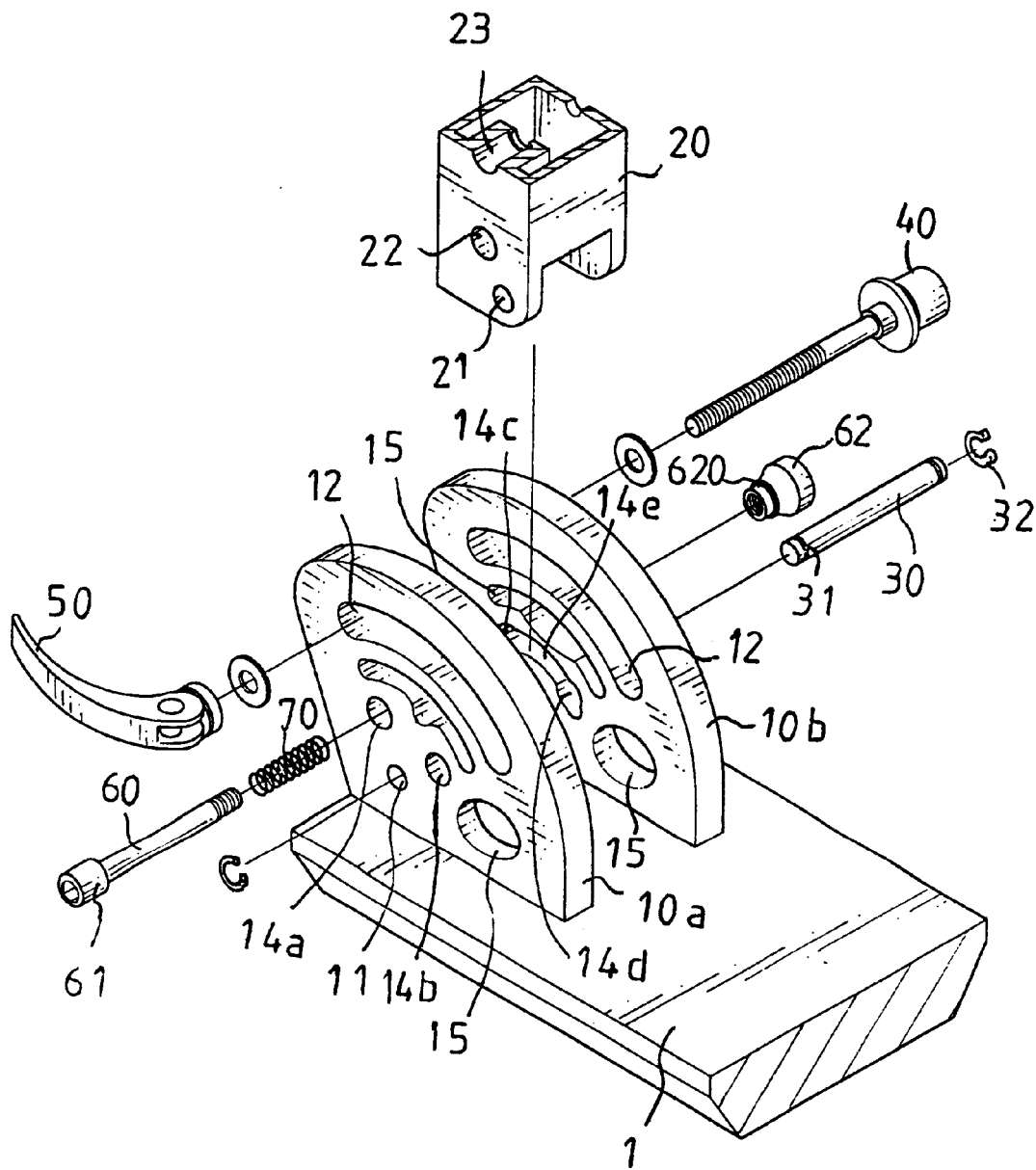
FIG. 2 is an exploded perspective view of a folding structure of the skate board scooter in accordance with the present invention.

Referring to FIG. 2, the mounting wall 10a includes an arcuate guide slot 12 in an upper portion thereof Below the arcuate guide slot 12 is a first positioning hole 14a and a second positioning hole 14b. The mounting wall 10b includes an arcuate guide slot 12 in an upper portion thereof. Below the arcuate guide slot 12 is a third positioning hole 14c, a fourth positioning hole 14d, and a connecting slot 14e that connects the third positioning hole 14c with the fourth positioning hole 14d. The mounting walls 10a and 10b include aligned pivotal holes 11. Each mounting wall 10a, 10b may further include holes 15 to reduce its weight.

Figure 5:
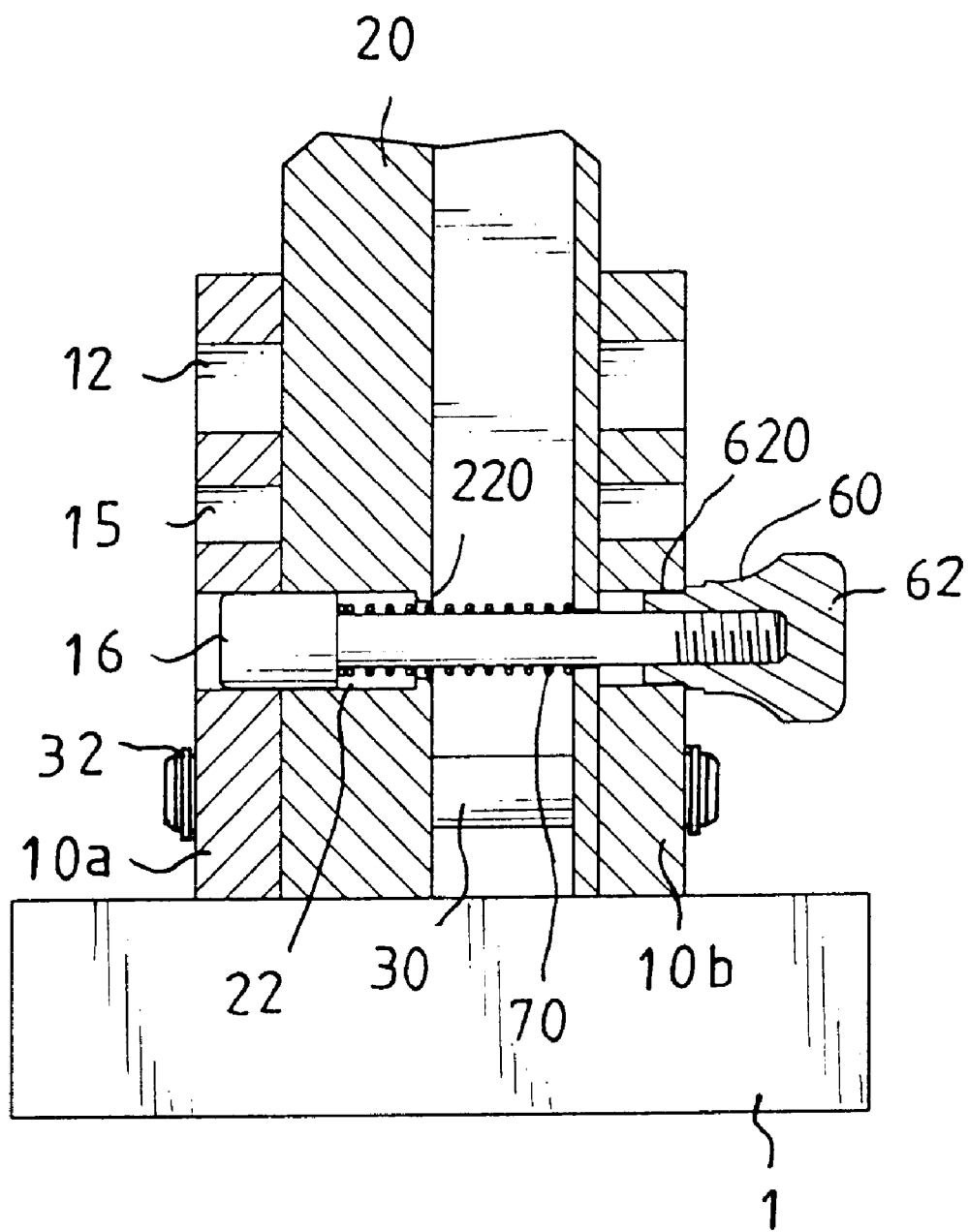
FIG. 5 is a sectional view of the folding structure of the skate board scooter in accordance with the present invention.

Still referring to FIG. 2, the connecting member 20 includes a pivotal hole 21 defined in a lower end thereof. Above the pivotal hole 21 is a guide hole 22 with a shoulder 220 (FIG. 5). Above the guide hole 22 is an adjusting hole 23.

A pivotal pin 30 is extended through the pivotal hole 11 in each mounting wall 10a, 10b and the pivotal hole 21 of the connecting member 20, thereby allowing pivotal movement of the connecting member 20 between the mounting walls 10a and 10b. The pivotal pin 30 includes two ends each having an annular groove 31, and a C-clip 32 is mounted to each annular grove 31 to prevent disengagement of the pivotal pin 30.

A quick release rod 40 is extended through the arcuate guide walls 12 in the mounting walls 10a and 10b and the adjusting hole 23 of the connecting member 20. A quick release lever 50 is engaged with an end of the quick release rod 40 to provide quick release function.

Referring to FIGS. 2 and 5, a positioning rod 60 is extended through the guide hole 22 of the connecting member 20 and includes a first end 61 and an enlarged second end 62. In this embodiment, the enlarged second end 62 is constructed by a knob threadedly engaged with an end of the positioning rod 60 which is opposite to the first end 61. In addition, the knob includes a reduced section 620 so as to be received in one of the positioning holes 14c and 14d of the mounting wall 10b. As illustrated in FIG. 5, a spring 70 is attached between the first end 61 of the positioning rod 60 and an inner wall of the connecting member 20, thereby biasing the first end 61 of the positioning rod 60 into one of the positioning holes 14a and 14b of the mounting wall 10a. The shoulder 220 of the guide hole 22 prevents disengagement of the positioning rod 60.

Figure 3:
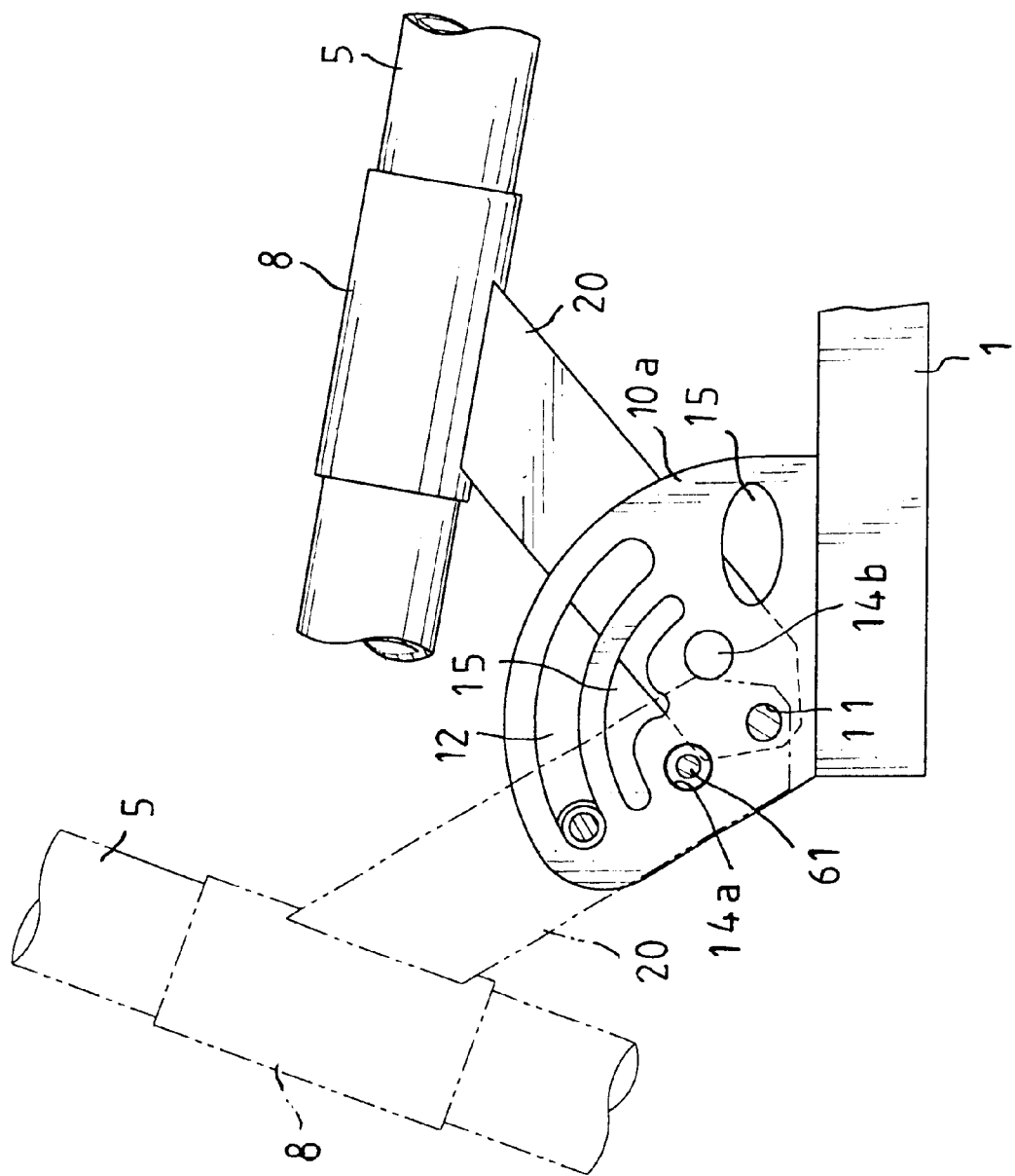
FIG. 3 is a schematic left side view of the folding structure of the skate board scooter in accordance with the present invention.
Figure 4:
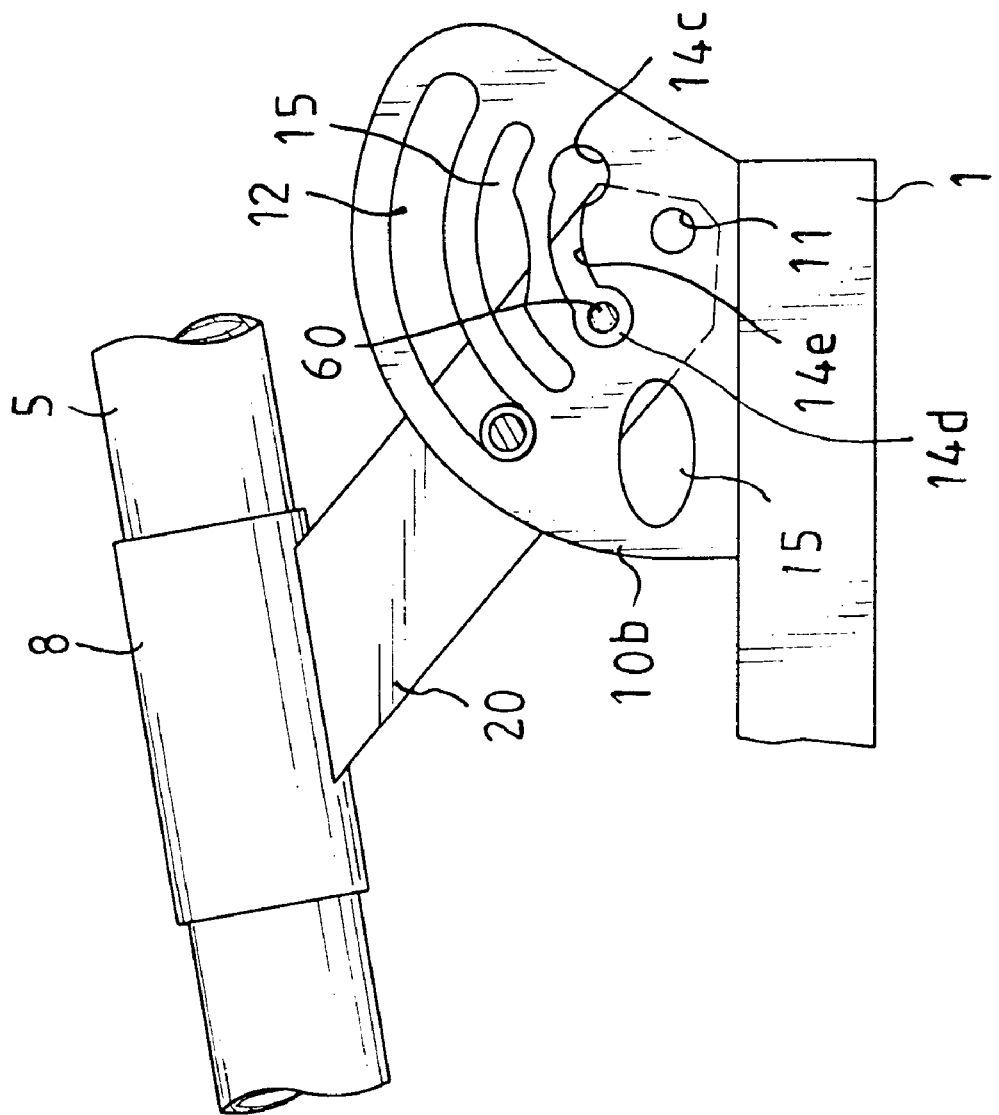
FIG. 4 is a schematic right side view of the folding structure of the skate board scooter in accordance with the present invention.

Referring to FIGS. 3, 4, and 5, when the first end 61 of the positioning rod 60 is received in the second positioning hole 14b of the mounting wall 10a and the reduced section 620 of the second end 62 of the positioning rod 60 is received in the fourth positioning hole 14d of the mounting wall 10b, the handlebar stem 5 is in a folded, storage position.

When in use, referring to FIG. 5, the user may pull the enlarged second end 62 of the positioning rod 60 outward such that the reduced section 620 is disengaged from the fourth positioning hole 14d of the mounting wall 10b. The first end 61 of the positioning rod 60 is moved away from the second positioning hole 14b of the mounting wall 10a and enters the guide hole 22. Thus, the connecting member 20 is no longer retained in place and pivotable between the mounting walls 10a and 10b about the pivotal pin 30 when the quick release lever 50 is in a release position. Thus, the user may pivot the handlebar stem 5 to an operative position shown by the broken lines in FIG. 3. The arcuate guide slots 12 allows pivotal movement of the quick release rod 14 and the connecting slot 14e in the mounting wall 10b allows pivotal movement of the positioning rod 60 until the enlarged second end 62 of the positioning rod 60 reaches a position aligned with the third positioning hole 14c of the mounting wall 10b. Still referring to FIG. 5, the enlarged second end 62 of the positioning rod 60 is then released such that the first end 61 of the positioning rod 60 enters the first positioning hole 14a under the action of the spring 70. The handlebar stem 5 is thus retained in its operative position, and the skate board scooter is ready for use as soon as the quick release lever 50 is moved to an engaged position.

According to the above description, it is appreciated that the present invention provides a structure that allows easy, rapid pivotal movement of the handlebar stem, thereby allowing the skate board scooter to be folded into a compact status for carriage and transport.

Although the invention has been explained in relation to its preferred embodiment, it is to be understood that many other possible modifications and variations can be made without departing from the scope of the invention as hereinafter claimed.

What is claimed is:

1. A skate board scooter comprising:
a base having a front end;
a head tube;
a handlebar stem extending through the head tube;
a connecting member extending from the head tube and having a lower end, the lower end of the connecting member including a pivotal hole, a guide hole, and an adjusting hole;
a first mounting wall and a second mounting wall mounted on the first end of the base, the first mounting wall and the second mounting wall being spaced apart to allow the lower end of the connecting member to pivot therebetween, the first mounting wall and the second mounting wall including aligned arcuate guide holes and aligned pivotal holes, the first mounting wall including a first positioning hole and a second positioning hole, the second mounting wall including a third positioning hole aligned with the first positioning hole, a fourth positioning hole aligned with the second positioning hole, and a connecting slot that communicates the third positioning hole with the fourth positioning hole;
a pivotal pin extending through the aligned pivotal holes of the first mounting wall and the second mounting wall and the pivotal hole of the connecting member;
a quick release rod extending through the aligned arcuate guide holes of the first mounting wall and the second mounting wall and the adjusting hole of the connecting member;
a quick release lever engaged with an end of the quick release rod;
a positioning rod including a first end and a second end, the positioning rod extending through the guide hole of the connecting member with the first end of the positioning rod releasably engaged within one of the first positioning hole and the second positioning hole and with the second end of the positioning rod releasably engaged in one of the third positioning hole and the fourth positioning hole;
whereby the handlebar stem is in an operative position when the first end of the positioning rod is engaged in the first positioning hole and the second end of the positioning rod is engaged in the third positioning hole, and the handlebar stem is in a storage position when the first end of the positioning rod is engaged in the second positioning hole and the second end of the positioning rod is engaged in the fourth positioning hole.

2. The skate board scooter as claimed in claim 1, wherein the second end of the positioning rod is enlarged to be grasped by a user, the first end of the positioning rod being disengageable from an associated one of the first positioning hole and the second positioning hole and movable into the guide hole of the connecting member to allow pivotal movement of the connecting member when the enlarged second end of the positioning rod is pulled out of the second mounting wall.

3. The skate board scooter as claimed in claim 2, further comprising means for biasing the first end of the positioning rod into the associated one of the first positioning hole and the second positioning hole.

4. The skate board scooter as claimed in claim 2, wherein the enlarged second end of the positioning rod includes a reduced section that is removably engaged in an associated one of the third positioning hole and the fourth positioning hole.

* * * * *